(12) United States Patent
Gieras et al.

(10) Patent No.: US 10,498,274 B2
(45) Date of Patent: Dec. 3, 2019

(54) HIGH VOLTAGE DIRECT CURRENT SYSTEM FOR A VEHICLE

(71) Applicant: Hamilton Sundstrand Corporation, Charlotte, NC (US)

(72) Inventors: Jacek F Gieras, Glastonbury, CT (US); Gregory I Rozman, Rockford, IL (US); Steven J Moss, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 237 days.

(21) Appl. No.: 15/348,313

(22) Filed: Nov. 10, 2016

(65) Prior Publication Data

US 2018/0131304 A1 May 10, 2018

(51) Int. Cl.
| | | |
|---|---|---|
| *H02P 9/48* | (2006.01) | |
| *H02K 3/12* | (2006.01) | |
| *H02K 3/28* | (2006.01) | |
| *H02M 7/00* | (2006.01) | |
| *H02K 19/34* | (2006.01) | |
| *H02K 21/48* | (2006.01) | |
| *H02K 1/16* | (2006.01) | |

(52) U.S. Cl.
CPC ............... *H02P 9/48* (2013.01); *H02K 1/165* (2013.01); *H02K 3/12* (2013.01); *H02K 3/28* (2013.01); *H02K 19/34* (2013.01); *H02K 21/48* (2013.01); *H02M 7/00* (2013.01)

(58) Field of Classification Search
USPC ........................................................ 310/198
See application file for complete search history.

(56) References Cited

U.S. PATENT DOCUMENTS

| | | | |
|---|---|---|---|
| 3,896,349 A | 7/1975 | Lozenko | |
| 4,649,337 A | 3/1987 | Stucker | |
| 4,780,659 A | 10/1988 | Bansal | |
| 5,198,698 A | 3/1993 | Paul | |
| 5,311,419 A | 5/1994 | Shires | |
| 5,318,142 A | 6/1994 | Bates | |
| 5,430,362 A | 7/1995 | Carr | |

(Continued)

FOREIGN PATENT DOCUMENTS

| | | |
|---|---|---|
| CN | 202395465 | 8/2012 |
| CN | 203056806 | 7/2013 |

(Continued)

OTHER PUBLICATIONS

Almendro (DE 3408394 A) English Translation (Year: 1985).*

(Continued)

*Primary Examiner* — Michael Andrews
*Assistant Examiner* — Robert E Mates
(74) *Attorney, Agent, or Firm* — Snell & Wilmer, L.L.P.

(57) ABSTRACT

An electric power system (EPS) may comprise a modular multilevel converter (MMC) and a synchronous generator in electronic communication with the MMC. The synchronous generator may comprise a stator comprising inner slots and outer slots. First, second, and third windings may be disposed in the inner slots configured to receive first, second, and third phase signals, respectively. The first, second, and third windings may each split into two arms, each arm comprising an additional winding disposed in the outer slots of the stator.

9 Claims, 7 Drawing Sheets

(56) References Cited

U.S. PATENT DOCUMENTS

| | | | |
|---|---|---|---|
| 5,536,987 A * | 7/1996 | Hayashi | H02K 1/243 310/181 |
| 5,642,021 A | 6/1997 | Liang | |
| 5,917,295 A | 6/1999 | Mongeau | |
| 6,058,031 A | 5/2000 | Lyons | |
| 6,101,102 A | 8/2000 | Brand | |
| 6,144,190 A | 11/2000 | Scott | |
| 6,229,243 B1 * | 5/2001 | Roesel, Jr. | H02K 1/278 310/216.015 |
| 6,456,946 B1 | 9/2002 | O'Gorman | |
| 6,697,271 B2 | 2/2004 | Corzine | |
| 6,873,134 B2 | 3/2005 | Canter | |
| 6,965,183 B2 | 11/2005 | Dooley | |
| 7,057,376 B2 | 6/2006 | Cook et al. | |
| 7,521,814 B2 | 4/2009 | Nasr | |
| 7,593,243 B2 | 11/2009 | Ganev et al. | |
| 7,619,237 B2 | 11/2009 | Rozman et al. | |
| 7,672,147 B1 | 3/2010 | Schutten | |
| 7,746,024 B2 | 6/2010 | Rozman et al. | |
| 7,777,384 B2 | 8/2010 | Gieras | |
| 7,906,866 B2 | 3/2011 | Anghel et al. | |
| 8,085,003 B2 | 12/2011 | Gieras | |
| 8,093,857 B1 | 1/2012 | Kolomeitsev | |
| 8,115,446 B2 | 2/2012 | Piccard | |
| 8,330,413 B2 | 12/2012 | Lazarovich | |
| 8,358,111 B2 | 1/2013 | Rozman et al. | |
| 8,513,911 B2 | 8/2013 | Jones et al. | |
| 8,738,268 B2 | 5/2014 | Karimi et al. | |
| 8,816,641 B2 | 8/2014 | Andrea et al. | |
| 8,829,723 B2 | 9/2014 | Gravoc et al. | |
| 8,896,252 B2 | 11/2014 | Yamada | |
| 8,982,593 B2 | 3/2015 | Nondahl et al. | |
| 9,059,647 B2 | 6/2015 | Rozman et al. | |
| 9,088,230 B2 | 7/2015 | Rozman et al. | |
| 9,118,206 B2 | 8/2015 | Peterson et al. | |
| 9,193,273 B1 | 11/2015 | Frank et al. | |
| 9,209,741 B2 | 12/2015 | Gao et al. | |
| 9,287,745 B2 | 3/2016 | Akatsu | |
| 9,325,229 B2 | 4/2016 | Rozman et al. | |
| 9,731,609 B2 | 8/2017 | Ambrosio | |
| 9,868,409 B2 | 1/2018 | Cook | |
| 9,985,562 B1 | 5/2018 | Rozman | |
| 2001/0054882 A1 | 12/2001 | Nakamura | |
| 2002/0053851 A1 * | 5/2002 | Kreuzer | H02K 3/28 310/179 |
| 2002/0190695 A1 | 12/2002 | Wall | |
| 2006/0006655 A1 | 1/2006 | Kanazawa | |
| 2006/0087869 A1 | 4/2006 | Weger | |
| 2008/0019062 A1 * | 1/2008 | Dooley | H02K 3/16 361/23 |
| 2008/0103632 A1 | 5/2008 | Saban et al. | |
| 2008/0164851 A1 | 7/2008 | Ganev | |
| 2009/0009019 A1 | 1/2009 | Li et al. | |
| 2009/0085531 A1 | 4/2009 | Ooiwa | |
| 2009/0146595 A1 | 6/2009 | Immler | |
| 2010/0133816 A1 | 6/2010 | Abolhassani et al. | |
| 2010/0244599 A1 | 9/2010 | Saban | |
| 2010/0276993 A1 | 11/2010 | King | |
| 2011/0121769 A1 | 5/2011 | Rozman | |
| 2011/0141773 A1 | 6/2011 | Larsen | |
| 2011/0176340 A1 | 7/2011 | Sakakibara | |
| 2012/0098261 A1 | 4/2012 | Rozman | |
| 2012/0119711 A1 | 5/2012 | Rozman | |
| 2012/0126758 A1 | 5/2012 | Fang | |
| 2013/0049648 A1 | 2/2013 | Rozman | |
| 2013/0320943 A1 | 12/2013 | Meehan | |
| 2014/0197639 A1 * | 7/2014 | Bala | H02J 3/386 290/54 |
| 2014/0208579 A1 * | 7/2014 | Wang | H02K 15/0031 29/596 |
| 2014/0226382 A1 | 8/2014 | Saito | |
| 2014/0346897 A1 | 11/2014 | Nangemannjoerg | |
| 2014/0347898 A1 | 11/2014 | Raju et al. | |
| 2014/0369092 A1 | 12/2014 | Nguyen | |
| 2015/0016159 A1 | 1/2015 | Deboy | |
| 2015/0061606 A1 | 3/2015 | Pan | |
| 2015/0061607 A1 | 3/2015 | Pan | |
| 2015/0180252 A1 | 6/2015 | Stempin | |
| 2015/0236634 A1 | 8/2015 | Han | |
| 2015/0298627 A1 | 10/2015 | Nordlander | |
| 2015/0311719 A1 | 10/2015 | Andresen | |
| 2015/0349598 A1 | 12/2015 | Gieras et al. | |
| 2018/0109193 A1 | 4/2018 | Hirota | |

FOREIGN PATENT DOCUMENTS

| | | |
|---|---|---|
| CN | 104158212 | 1/2015 |
| CN | 104269875 | 1/2015 |
| CN | 105656269 | 6/2016 |
| DE | 3408394 A * | 12/1985 |
| EP | 0881752 | 12/1998 |
| EP | 2114001 | 11/2009 |
| EP | 2259422 | 12/2010 |
| EP | 2341608 | 7/2011 |
| EP | 2579437 | 4/2013 |
| EP | 2725689 | 4/2014 |
| EP | 2815913 | 12/2014 |
| FR | 2920260 | 2/2009 |
| GB | 828734 | 2/1960 |
| GB | 2506719 | 4/2014 |
| JP | 2007209199 | 8/2007 |
| JP | 2015080283 | 4/2015 |
| WO | 2012016062 | 2/2012 |
| WO | 2014026840 | 2/2014 |
| WO | 2014157719 | 10/2014 |
| WO | 2016194790 | 12/2016 |

OTHER PUBLICATIONS

USPTO, Non-Final Office Action dated Dec. 14, 2018 in U.S. Appl. No. 15/236,890.
USPTO, First Action Interview Office Action dated May 16, 2018 in U.S. Appl. No. 15/453,350.
USPTO, Notice of Allowance dated Apr. 11, 2018 in U.S. Appl. No. 15/453,383.
European Patent Office, European Search Report dated Mar. 14, 2018 in Application No. 17196186.5-1201.
U.S. Appl. No. 15/207,901, filed Jul. 12, 2016 and entitled Integrated Modular Electric Power System for a Vehicle.
U.S. Appl. No. 15/236,890, filed Aug. 15, 2016 and entitled Active Rectifier Topology.
U.S. Appl. No. 15/249,639, filed Aug. 29, 2016 and entitled Power Generating Systems Having Synchronous Generator Multiplex Windings and Multilevel Inverters.
U.S. Appl. No. 15/348,335, filed Nov. 10, 2016 and entitled Electric Power Generating System With a Syncrhonous Generator.
U.S. Appl. No. 15/397,354, filed Jan. 3, 2017 And entitled Electric Power Generating System With a Permanent Magnet Generator.
U.S. Appl. No. 15/453,350, filed Mar. 8, 2017 And entitled Electric Power Generating System With a Permanent Magnet Generator and Combination of Active and Passive Rectifiers.
U.S. Appl. No. 15/453,383, filed Mar. 8, 2017 And entitled Electric Power Generating System With a Synchronous Generator and a Tunable Filter.
Xu, et al., "Reliability analysis and redundancy configuration of MMC with hybrid submodule topologies," IEEE Trans. Power Electron, vol. 31, No. 4, pp. 2720-2729, Apr. 2016.
Gupta, et al., "Multilevel inverter topologies with reduced device count: a review," IEEEE Trans. Power Electron, vol. 31, No. 1, pp. 135-151, Jan. 2016.
Soong, et al., "Assessment of Fault Tolerance in Modular Multilevel Converters with Integrated Energy Storage," IEEE Trans. Power Electron., vol. 31, No. 6, pp. 4085-4095, Jun. 2016.
USPTO, Notice of Allowance dated Sep. 12, 2018 in U.S. Appl. No. 15/453,350.
USPTO, Final Rejection Office Action dated Oct. 4, 2018 in U.S. Appl. No. 15/236,890.

(56) References Cited

OTHER PUBLICATIONS

European Patent Office, European Search Report dated Mar. 19, 2018 in Application No. 17200650.4-1202.
European Patent Office, European Search Report dated May 4, 2018 in Application No. 18150104.0-1202.
Pre-Interview First Office Action dated Apr. 16, 2018 in U.S. Appl. No. 15/453,350.
European Patent Office, European Search Report dated Jul. 30, 2018 in Application No. 18160703.7-1202.
Balog R et al.: "Automatic tuning of coupled inductor filters", Power Electronics Specialists Conference; [Annual Power Electronics Specialists Conference], vol. 2, Jun. 23, 2002 (Jun. 23, 2002), pp. 591-596.
Nishida Yet Al: "A new harmonic reducing three-phase diode rectifier for high voltage and high power applications", Industry Applications Conference, 1997. Thirty-Second IAS Annual Meeting, IAS 97., Conference Record of the 1997 IEEE New Orleans, LA, USA, Oct. 5-9, 1997, New York, NY, USA, IEEE, US, vol. 2, Oct. 5, 1997 (Oct. 5, 1997), pp. 1624-1632.
European Patent Office, European Search Report dated Mar. 19, 2018 in Application No. 17174627.4.
Khomfoi, Surin and Leon M. Tolbert, Chapter 31 Multilevel Power Converters, The University of Tennessee, pp. 31-1-31-50 (2007).
European Patent Office, European Search Report dated Apr. 22, 2016 in Application No. 15168153.3.
USPTO, Non-Final Office Action dated Mar. 9, 2018 in U.S. Appl. No. 15/236,890.
European Patent Office, European Search Report dated Jan. 16, 2018 in Application No. 17185067.0.
European Patent Office, European Search Report dated Jan. 22, 2018 in Application No. 17184013.5.
M. Popescu, D. G. Dorrell, L. Alberti, N. Bianchi, D.A. Stalton, and D. Hawkins, Thermal Analysis of Duplex Three-Phase Induction Motor Under Fault Operating Conditions, IEEE Trans. On Industry Applications, vol. 49, No. 4, Jul./Aug. 2013, pp. 1523-1.
USPTO, Notice of Allowance dated Feb. 15, 2018 in U.S. Appl. No. 15/207,901.
USPTO, Non-Final Office Action dated Mar. 14, 2019 in U.S. Appl. No. 15/249,639.
USPTO, Non-Final Office Action dated Apr. 5, 2019 in U.S. Appl. No. 15/397,354.
USPTO, Final Office Action dated Jun. 27, 2019 in U.S. Appl. No. 15/236,890.
USPTO, Advisory Action dated Sep. 18, 2019 in U.S. Appl. No. 15/236,890.

\* cited by examiner

HIGH VOLTAGE DIRECT CURRENT SYSTEM FOR A VEHICLE

FIELD

The disclosure generally relates to electrical power systems, and more particularly to the design of an electrical power system for a vehicle.

BACKGROUND

Ground vehicles, included those suitable for off road use, have migrated toward hybrid electric technology using high voltage direct current (HVDC) distribution. Modular multilevel converters (MMCs) have been considered for HVDC to achieve low harmonic distortion with moderate switching frequency. MMCs are suitable for integration with energy storage devices. MMC topologies typically include large inductors connected to the MMC arms.

SUMMARY

In various embodiments, a synchronous generator is disclosed. A synchronous generator may comprise a stator, inner slots disposed in the stator, outer slots disposed in the stator, a fourth winding disposed in the outer slots, the fourth winding configured to receive a first phase signal, a fifth winding disposed in the outer slots, the fifth winding configured to receive the first phase signal, a sixth winding disposed in the outer slots, the sixth winding configured to receive a second phase signal, a seventh winding disposed in the outer slots, the seventh winding configured to receive the second phase signal, an eighth winding disposed in the outer slots, the eighth winding configured to receive a third phase signal, and a ninth winding disposed in the outer slots, the ninth winding configured to receive the third phase signal.

In various embodiments, the synchronous generator may further comprise a first winding disposed in the inner slots, the first winding configured to receive the first phase signal, a second winding disposed in the inner slots, the second winding configured to receive the second phase signal, and a third winding disposed in the inner slots, the third winding configured to receive the third phase signal. The first winding may be connected in series with the fourth winding and the fifth winding, the second winding may be connected in series with the sixth winding and the seventh winding, and the third winding may be connected in series with the eighth winding and the ninth winding. The fourth winding, the fifth winding, the sixth winding, the seventh winding, the eighth winding, and the ninth winding may be inductive. The synchronous generator may comprise one of a wound field generator or a permanent magnet generator. The synchronous generator may be driven by a shaft. The synchronous generator may further comprise a control winding configured to regulate an output voltage of the synchronous generator and configured to be controlled by a controller.

In various embodiments, an electric power system (EPS) is disclosed. An EPS may comprise a modular multilevel converter (MMC), and a synchronous generator in electronic communication with the MMC. The synchronous generator may comprise a stator, inner slots disposed in the stator, outer slots disposed in the stator, a fourth winding disposed in the outer slots, the fourth winding configured to receive a first phase signal, a fifth winding disposed in the outer slots, the fifth winding configured to receive the first phase signal, a sixth winding disposed in the outer slots, the sixth winding configured to receive a second phase signal, a seventh winding disposed in the outer slots, the seventh winding configured to receive the second phase signal, an eighth winding disposed in the outer slots, the eighth winding configured to receive a third phase signal, and a ninth winding disposed in the outer slots, the ninth winding configured to receive the third phase signal.

In various embodiments, the MMC may comprise a first arm comprising a first plurality of sub-modules connected in series, the first arm connected in series with the fourth winding, a second arm comprising a second plurality of sub-modules connected in series, the second arm connected in series with the fifth winding, a third arm comprising a third plurality of sub-modules connected in series, the third arm connected in series with the sixth winding, a fourth arm comprising a fourth plurality of sub-modules connected in series, the fourth arm connected in series with the seventh winding, a fifth arm comprising a fifth plurality of sub-modules connected in series, the fifth arm connected in series with the eighth winding, and a sixth arm comprising a sixth plurality of sub-modules connected in series, the sixth arm connected in series with the ninth winding. The synchronous generator may further comprise a first winding disposed in the inner slots, the first winding configured to receive the first phase signal, a second winding disposed in the inner slots, the second winding configured to receive the second phase signal, and a third winding disposed in the inner slots, the third winding configured to receive the third phase signal. The MMC may be configured to convert a three-phase signal received from the synchronous generator to a DC signal. The EPS may further comprise a controller configured to control the MMC. The synchronous generator may further comprise a control winding configured to regulate an output voltage of the synchronous generator and configured to be controlled by the controller. Each of the sub-modules may comprises at least one of a half-bridge topology, a full H-bridge topology, a half-bridge topology mixed with a full H-bridge, a cross coupled half-bridge, a clamp-double sub-module, or a semi-full-bridge. The first winding may be connected in series with the fourth winding and the fifth winding, the second winding may be connected in series with the sixth winding and the seventh winding, and the third winding may be connected in series with the eighth winding and the ninth winding. The fourth winding, the fifth winding, the sixth winding, the seventh winding, the eighth winding, and the ninth winding may be inductive. The synchronous generator may comprise one of a wound field generator or a permanent magnet generator. The synchronous generator may be driven by a shaft.

In various embodiments, a method of converting a synchronous generator three-phase signal to a direct current (DC) signal is disclosed. A method of converting a synchronous generator three-phase signal to a DC signal may comprise transmitting a first phase signal through a first winding of a stator, transmitting the first phase signal from the first winding to a fourth winding of the stator and a fifth winding of the stator, and the first winding connected in series with the fourth winding and the fifth winding, and transmitting the first phase signal from the synchronous generator to a modular multilevel converter (MMC).

In various embodiments, the method may further comprise transmitting a second phase signal through a second winding of the stator, transmitting the second phase signal from the second winding to a sixth winding of the stator and a seventh winding of the stator, and the second winding connected in series with the sixth winding and the seventh winding, transmitting the second phase signal from the synchronous generator to the MMC, transmitting a third phase signal through a third winding of the stator, transmitting the third phase signal from the third winding to an eighth winding of the stator and a ninth winding of the stator, and the third winding connected in series with the eighth winding and the ninth winding, and transmitting the third phase signal from the synchronous generator to the MMC.

The foregoing features, elements, steps, or methods may be combined in various combinations without exclusivity, unless expressly indicated herein otherwise. These features, elements, steps, or methods as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

Figure 1:
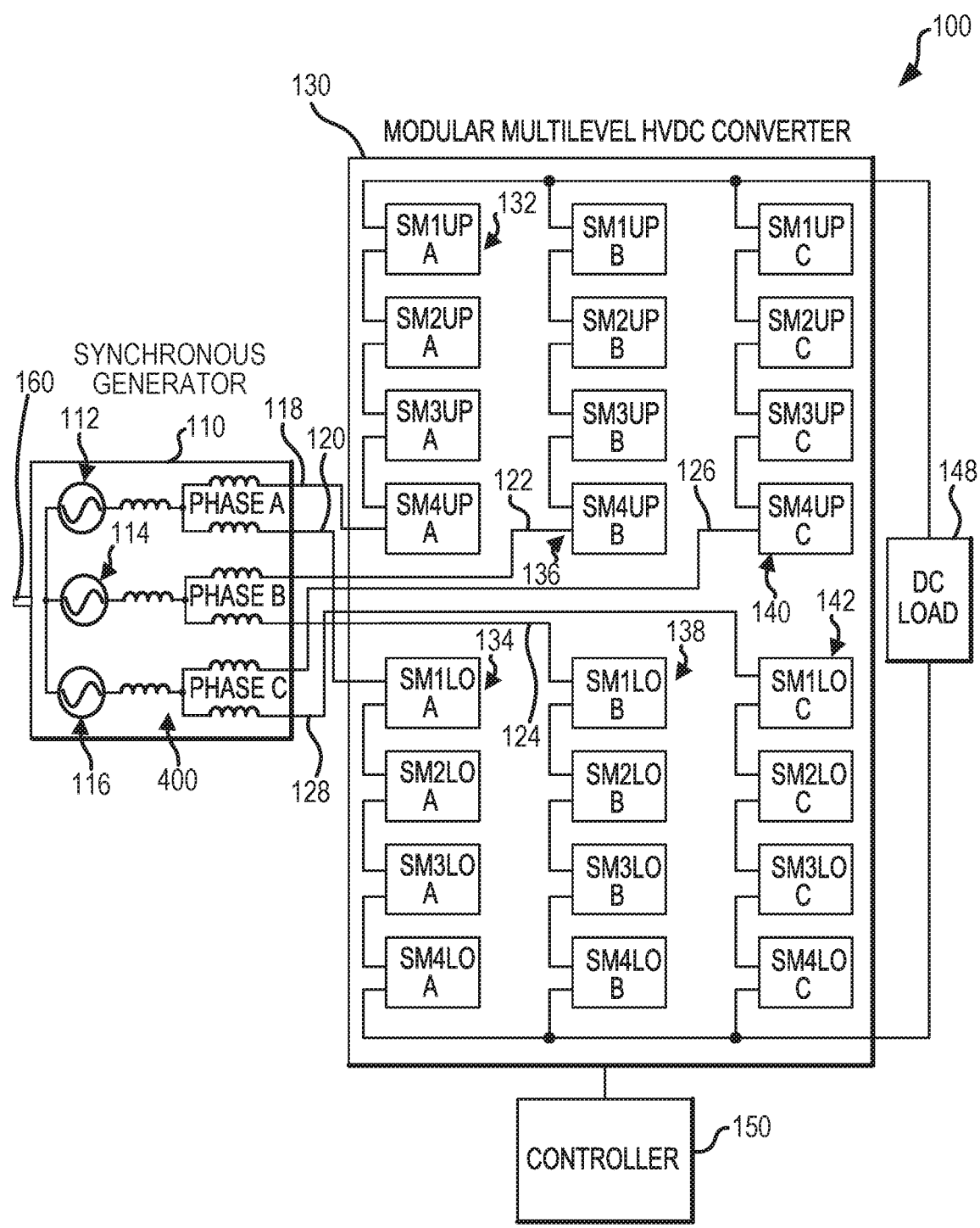
FIG. 1 illustrates a schematic view of an electric power system (EPS), in accordance with various embodiments.

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

As used herein, "electronic communication" means communication of electronic signals with physical coupling (e.g., "electrical communication" or "electrically coupled") or without physical coupling and via an electromagnetic field (e.g., "inductive communication" or "inductively coupled" or "inductive coupling"). In that regard, use of the term "electronic communication" includes both "electrical communication" and "inductive communication."

In various embodiments, MMCs of the present disclosure make use of low voltage semiconductor power sub-modules and low voltage batteries and/or capacitors to provide electric power to high voltage loads. Electronic power systems (EPSs) of the present disclosure comprise synchronous generators having inductive windings (or arm inductors) disposed in outer slots of a stator which are connected to the appropriate arms of the MMC. Little or no electromagnetic fields (EMFs) are induced in these inductive windings by the rotor field excitation system. In this regard, MMCs of the present disclosure may result in improved packaging by removing arm inductors from the MMC. EPSs of the present disclosure have significant reduction in electromagnetic induction (EMI) emissions, which may result in weight and size improvement of EMI filters. EPSs of the present disclosure may comprise low harmonic distortion with moderate switching frequency.

With respect to FIGS. 2, 3, 4, 5, 6, and 7, elements with like element numbering, as depicted in FIG. 1, are intended to be the same and will not necessarily be repeated for the sake of clarity.

With reference to FIG. 1, an electric power system (EPS) 100, in accordance with various embodiments. EPS 100 may include a synchronous generator 110 in electronic communication with a modular multilevel converter (MMC) 130. In various embodiments, synchronous generator 110 may comprise a wound field generator. In various embodiments, synchronous generator 110 may comprise a permanent magnet generator (PMG). Synchronous generator 110 may generate a three-phase signal, including a first phase signal 112, a second phase signal 114, and a third phase signal 116. Synchronous generator 110 may include a stator and a plurality of inductive windings, as described in further detail herein. In various embodiments, synchronous generator 110 may be coupled to a rotating shaft to generate electric power. In various embodiments, synchronous generator 110 may be driven by a shaft 160. An engine, such as an internal combustion engine for example, may drive the shaft 160 which may provide mechanical input to synchronous generator 110.

In various embodiments, MMC 130 may comprise a high voltage direct current (HVDC) converter. MMC 130 may be configured to convert a three-phase signal generated by synchronous generator 110 to a DC signal. MMC 130 may include a plurality of arms, wherein each arm comprises an array of sub-modules. MMC 130 may include first arm 118, second arm 120, third arm 122, fourth arm 124, fifth arm 126, and sixth arm 128. First arm 118 may comprise first plurality of sub-modules 132. Second arm 120 may comprise second plurality of sub-modules 134. Third arm 122 may comprise third plurality of sub-modules 136. Fourth arm 124 may comprise fourth plurality of sub-modules 138. Fifth arm 126 may comprise fifth plurality of sub-modules 140. Sixth arm 128 may comprise sixth plurality of sub-modules 142. A controller 150 may control MMC 130. A DC load 148 may receive electric power from MMC 130.

Figure 3:
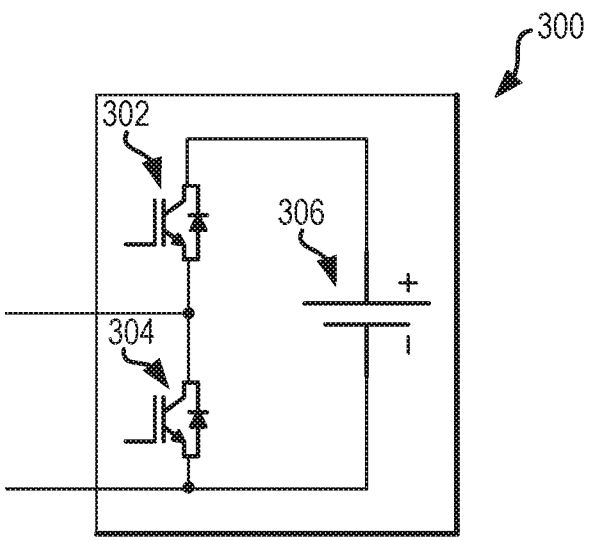
FIG. 3 illustrates a schematic view of a sub-module, in accordance with various embodiments.

With combined reference to FIG. 1 and FIG. 3, a sub-module 300 is illustrated, in accordance with various embodiments. Sub-module 300 may comprise a half-bridge topology. Sub-module 300 may include power switching devices such as a first switching field effect transistor (FET) or insulated gate bipolar transistor (IGBT) 302, a second switching FET or IGBT 304, and a power source 306. In various embodiments, power source 306 may comprise a battery. In various embodiments, power source 306 may comprise a capacitor, such as a supercapacitor for example. The sub-modules of MMC 130 may be similar to sub-module 300. Controller 150 may control first switching IGBT 302, a second switching IGBT 304. In various embodiments, sub-module 300 may comprise a full H-bridge topology, a half-bridge topology mixed with a full H-bridge, a cross coupled half-bridge, a clamp-double sub-module, or a semi-full-bridge.

With reference to FIG. 1, voltage may increase along first arm 118 from synchronous generator 110 to DC load 148. Voltage may increase along third arm 122 from synchronous generator 110 to DC load 148. Voltage may increase along fifth arm 126 from synchronous generator 110 to DC load 148. Voltage may decrease along second arm 120 from synchronous generator 110 to DC load 148. Voltage may decrease along fourth arm 124 from synchronous generator 110 to DC load 148. Voltage may decrease along sixth arm 128 from synchronous generator 110 to DC load 148.

Figure 2:
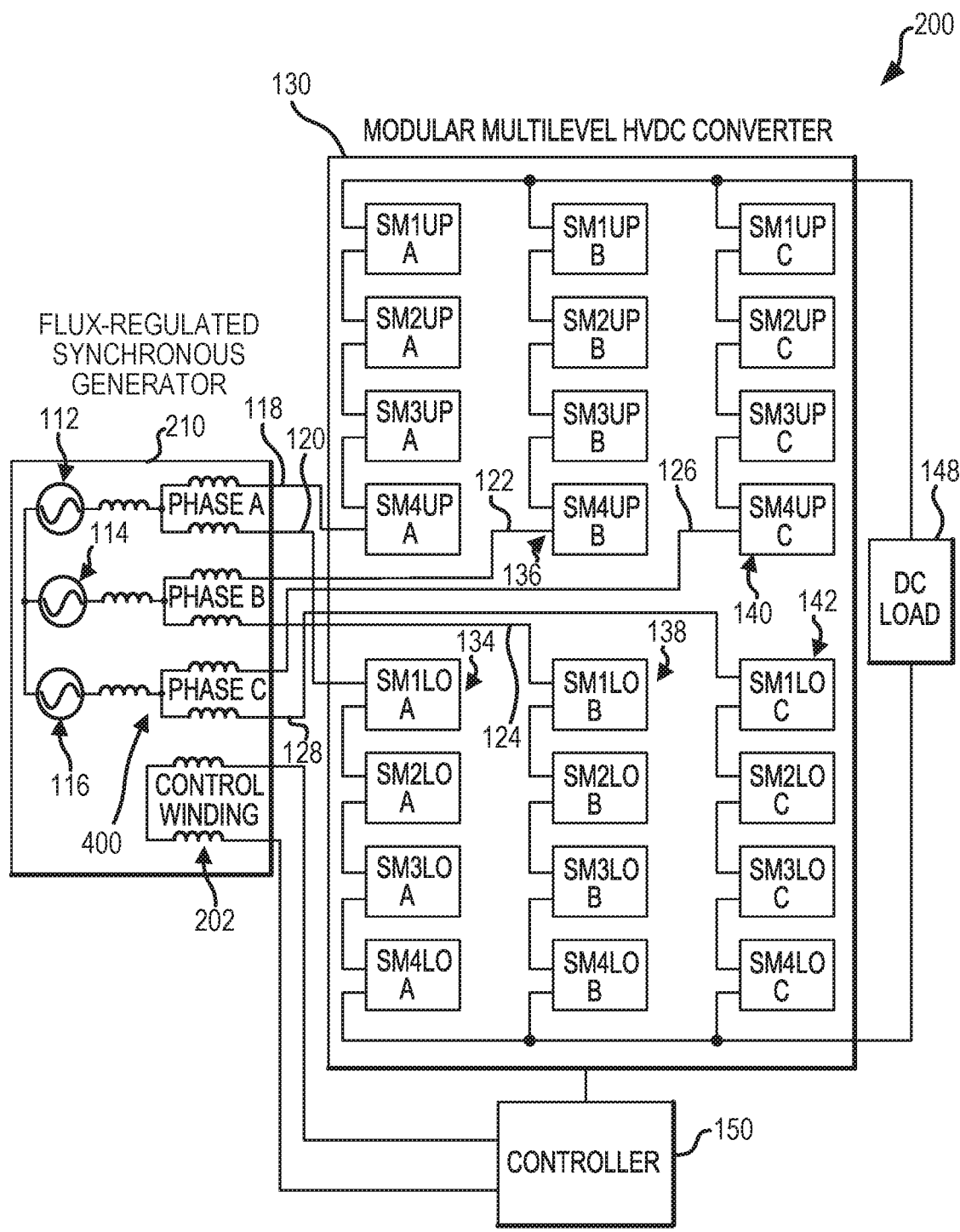
FIG. 2 illustrates a schematic view of an electric power system (EPS) with a flux regulated synchronous generator, in accordance with various embodiments.

With reference to FIG. 2, an EPS 200 is illustrated, in accordance with various embodiments. EPS 200 may be similar to EPS 100, with momentary reference to FIG. 1. EPS 200 may include flux-regulated synchronous generator 210. Flux-regulated synchronous generator 210 may be similar to synchronous generator 110. Flux-regulated synchronous generator 210 may include control winding 202. Control winding 202 may be in electronic communication with controller 150. Controller 150 may control the output voltage of flux-regulated synchronous generator 210 via control winding 202.

Figure 4:
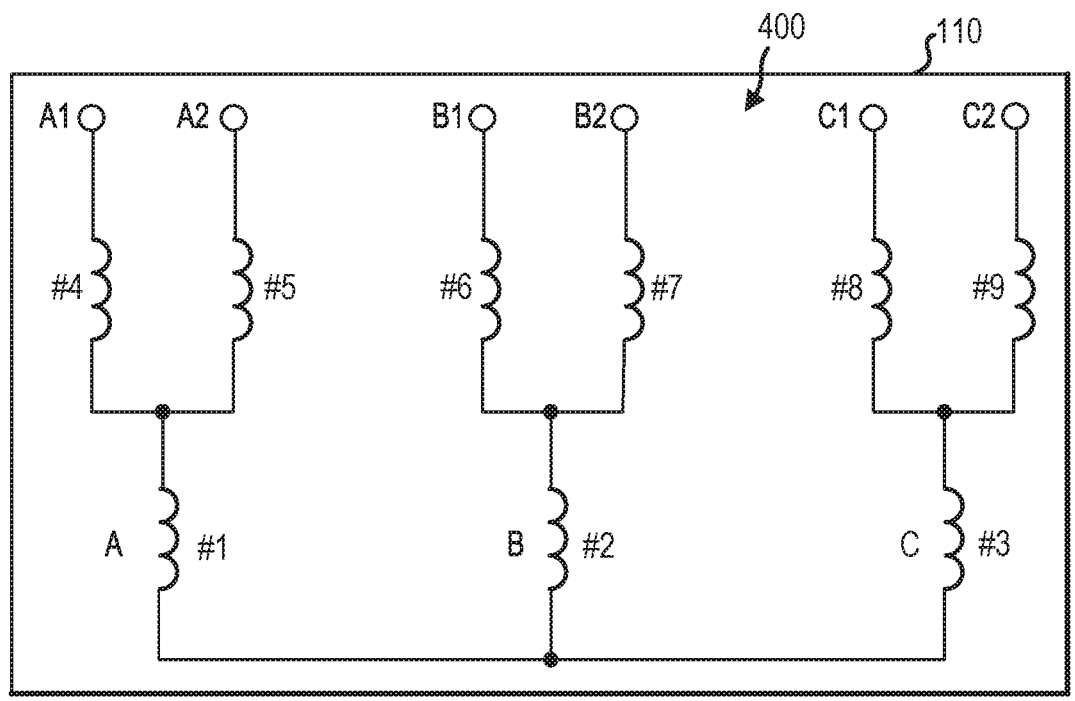
FIG. 4 illustrates a schematic view of windings included in a synchronous generator, in accordance with various embodiments.

With combined reference to FIG. 1 and FIG. 4, the windings 400 of synchronous generator 110 are illustrated, in accordance with various embodiments. Synchronous generator 110 may include winding A (also referred to herein as a first winding), winding B (also referred to herein as a second winding), and winding C (also referred to herein as a third winding). Winding A may receive first phase signal 112. Winding B may receive second phase signal 114. Winding C may receive third phase signal 116. Synchronous generator 110 may include winding A1 (also referred to herein as a fourth winding), winding A2 (also referred to herein as a fifth winding), winding B1 (also referred to herein as a sixth winding), winding B2 (also referred to herein as a seventh winding), winding C1 (also referred to herein as an eighth winding), and winding C2 (also referred to herein as a ninth winding). Winding A1 and winding A2 may be coupled in series with winding A. Winding B1 and winding B2 may be coupled in series with winding B. Winding C1 and winding C2 may be coupled in series with winding C.

Winding A, winding A1, and winding A2 may be configured to receive first phase signal 112. Winding B, winding B1, and winding B2 may be configured to receive second phase signal 114. Winding C, winding C1, and winding C2 may be configured to receive third phase signal 116.

Figure 5:
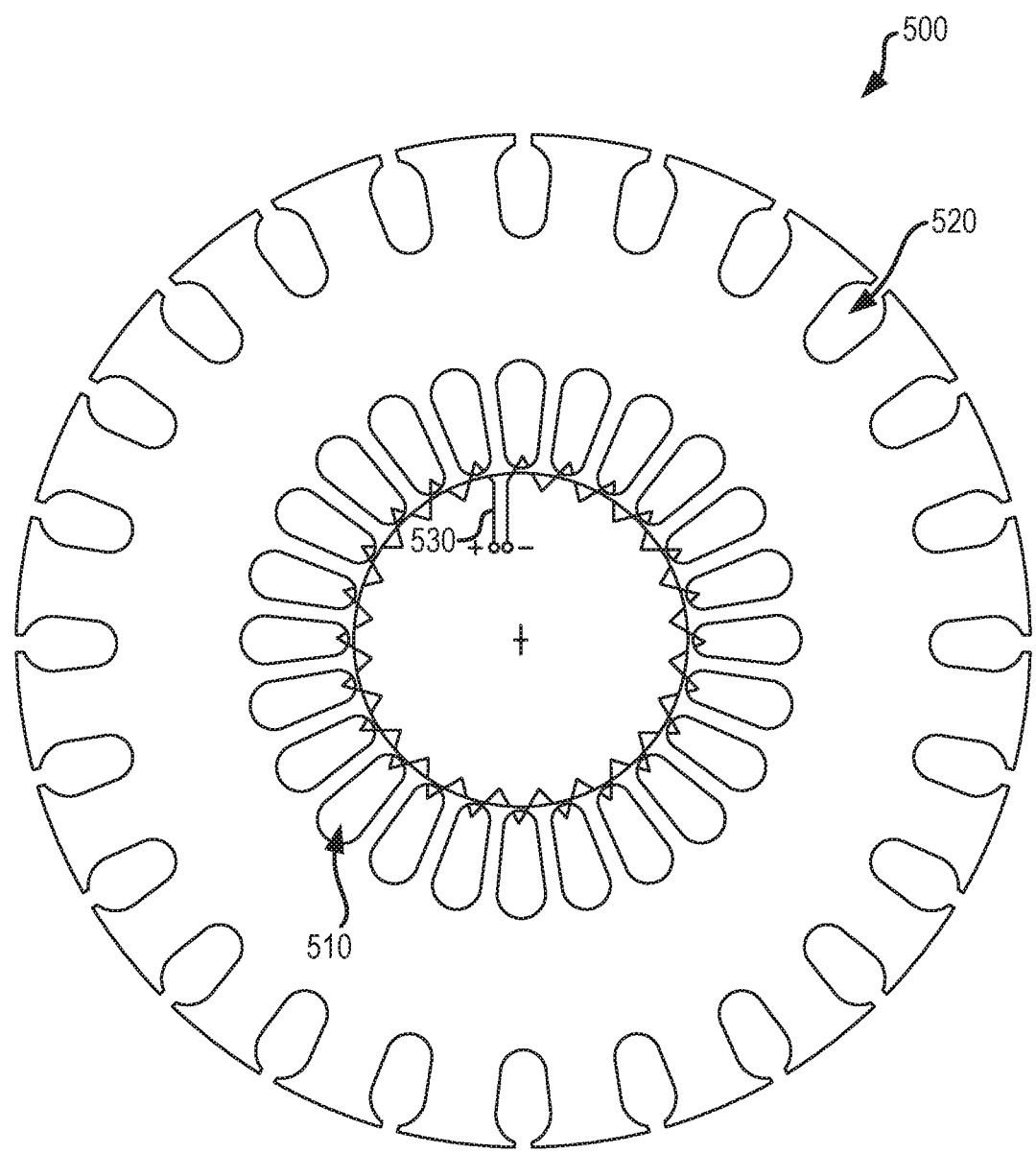
FIG. 5 illustrates a stator for a synchronous generator having a control winding, in accordance with various embodiments.

With reference to FIG. 5, a stator 500 for a synchronous generator is illustrated, in accordance with various embodiments. Stator 500 may comprise inner slots 510 and outer slots 520. Inner slots 510 may comprise radially inner slots. Outer slots 520 may comprise radially outer slots. Stator 500 of FIG. 5 comprises twenty-four inner slots 510 and twenty-four outer slots 520. However, stator 500 may include any number of inner slots 510 and outer slots 520. Stator 500 may include a control winding 530. Control winding 530 may be disposed in inner slots 510. In this regard, stator 500 may comprise magnetic flux regulation. In various embodiments, control winding 530 may be omitted. Control winding 202 may be similar to control winding 530, with momentary reference to FIG. 2.

With combined reference to FIG. 5 and FIG. 4, winding A, winding B, and winding C (collectively referred to herein as windings ABC) may be disposed in inner slots 510. Winding A1, winding A2, winding B1, winding B2, winding C1, and winding C2 (collectively referred to herein as windings A1A2B1B2C1C2) may be disposed in outer slots 520.

Figure 6:
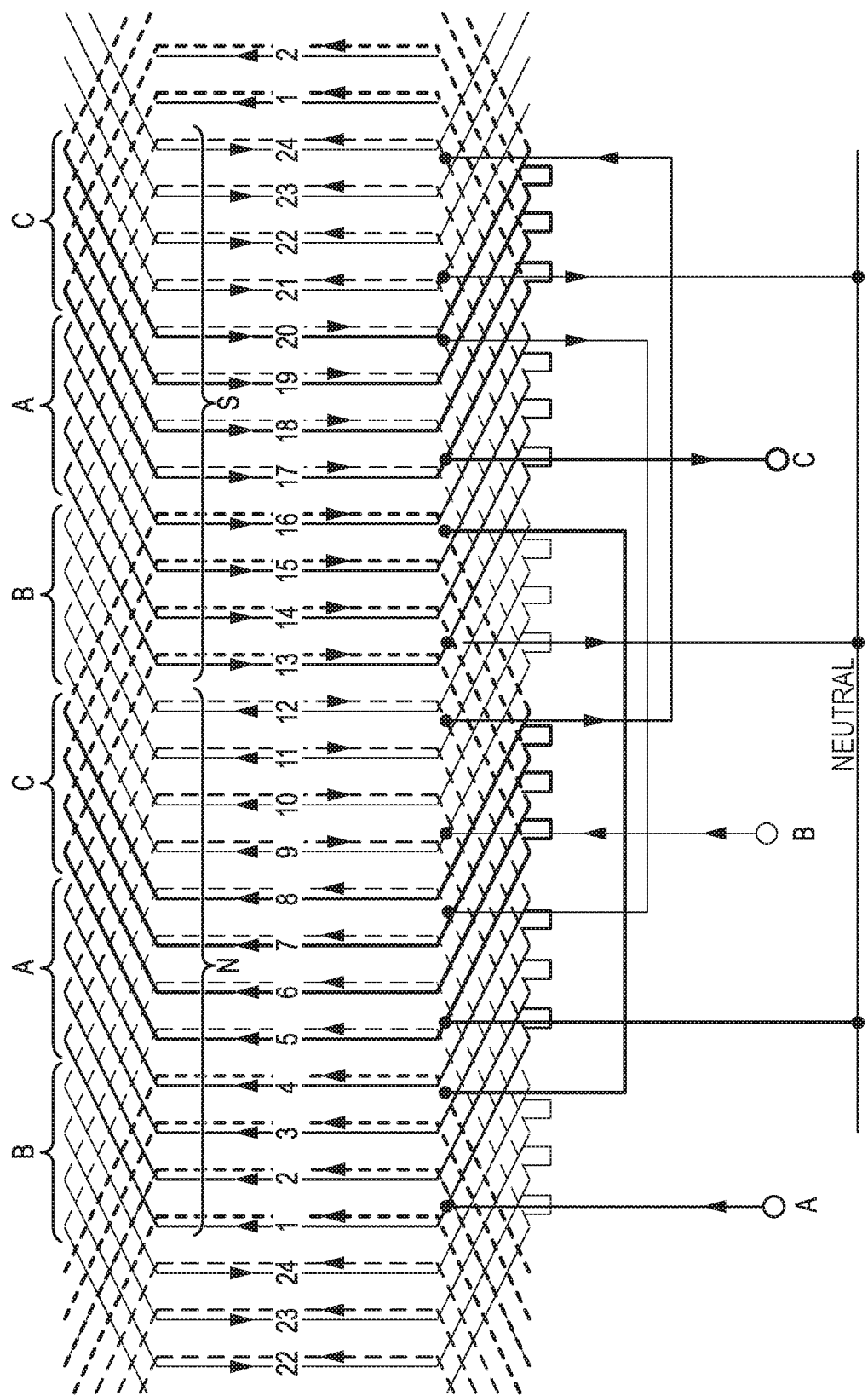
FIG. 6 illustrates a flat winding diagram of an exemplary three-phase winding ABC located in the inner slots of the stator of FIG. 5, in accordance with various embodiments.

With reference to FIG. 6, a flat winding diagram of windings ABC is illustrated, in accordance with various embodiments. Each inner slot, one through twenty-four (1-24), is enumerated in FIG. 6 to schematically illustrated the location of the windings ABC. In various embodiments, inner slots 1-12 may comprise a north pole (N). In various embodiments, inner slots 13-24 may comprise a south pole (S).

Figure 7:
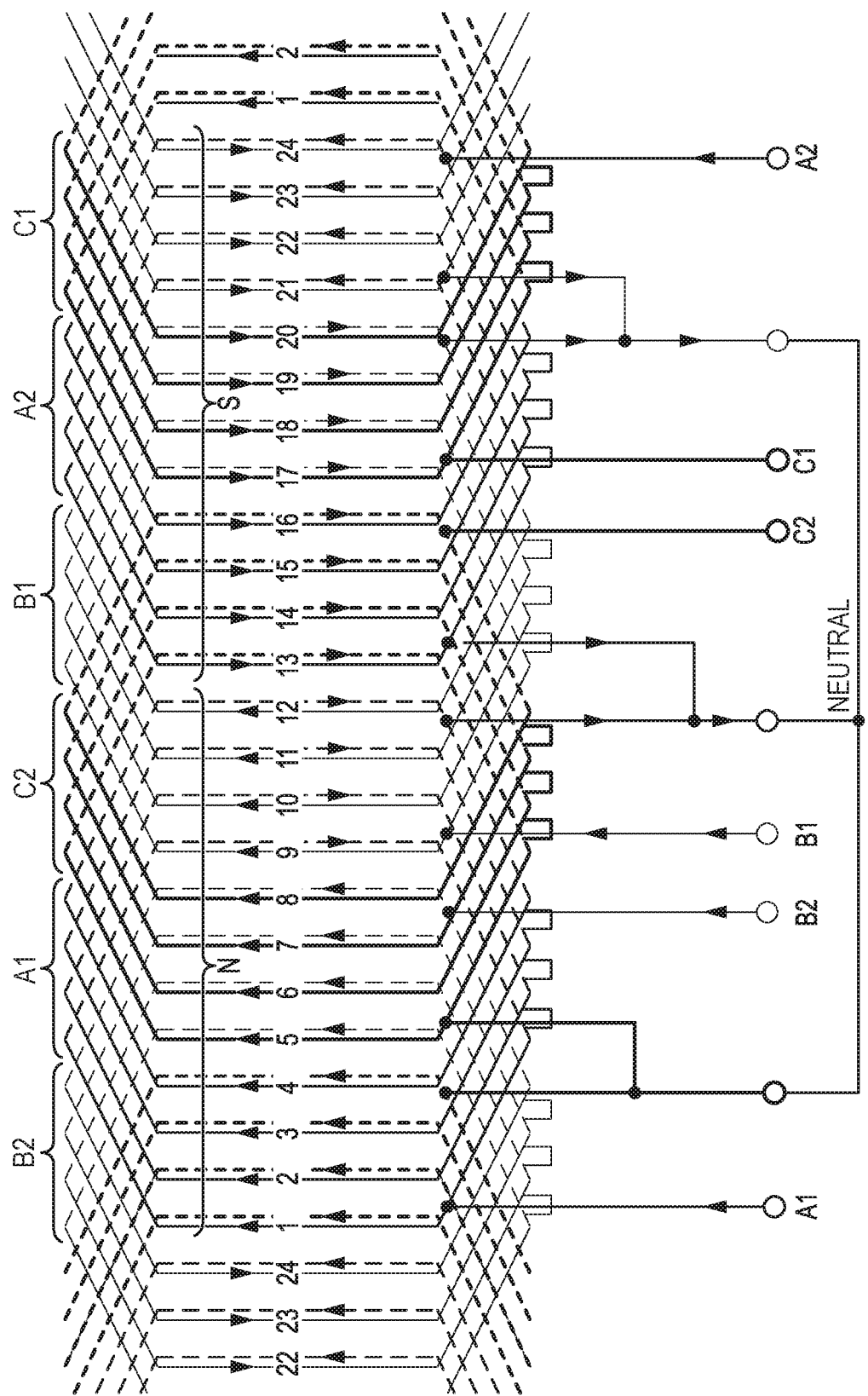
FIG. 7 illustrates a flat winding diagram of an exemplary three-phase winding A1A2B1B2C1C2 located in the outer slots of the stator of FIG. 5, in accordance with various embodiments.

With reference to FIG. 7, a flat winding diagram of windings A1A2B1B2C1C2 is illustrated, in accordance with various embodiments. Each outer slot, one through twenty-four (1-24), is enumerated in FIG. 7 to schematically illustrated the location of the windings A1A2B1B2C1C2. In various embodiments, outer slots 1-12 may comprise a north pole (N). In various embodiments, outer slots 13-24 may comprise a south pole (S).

Figure 8:
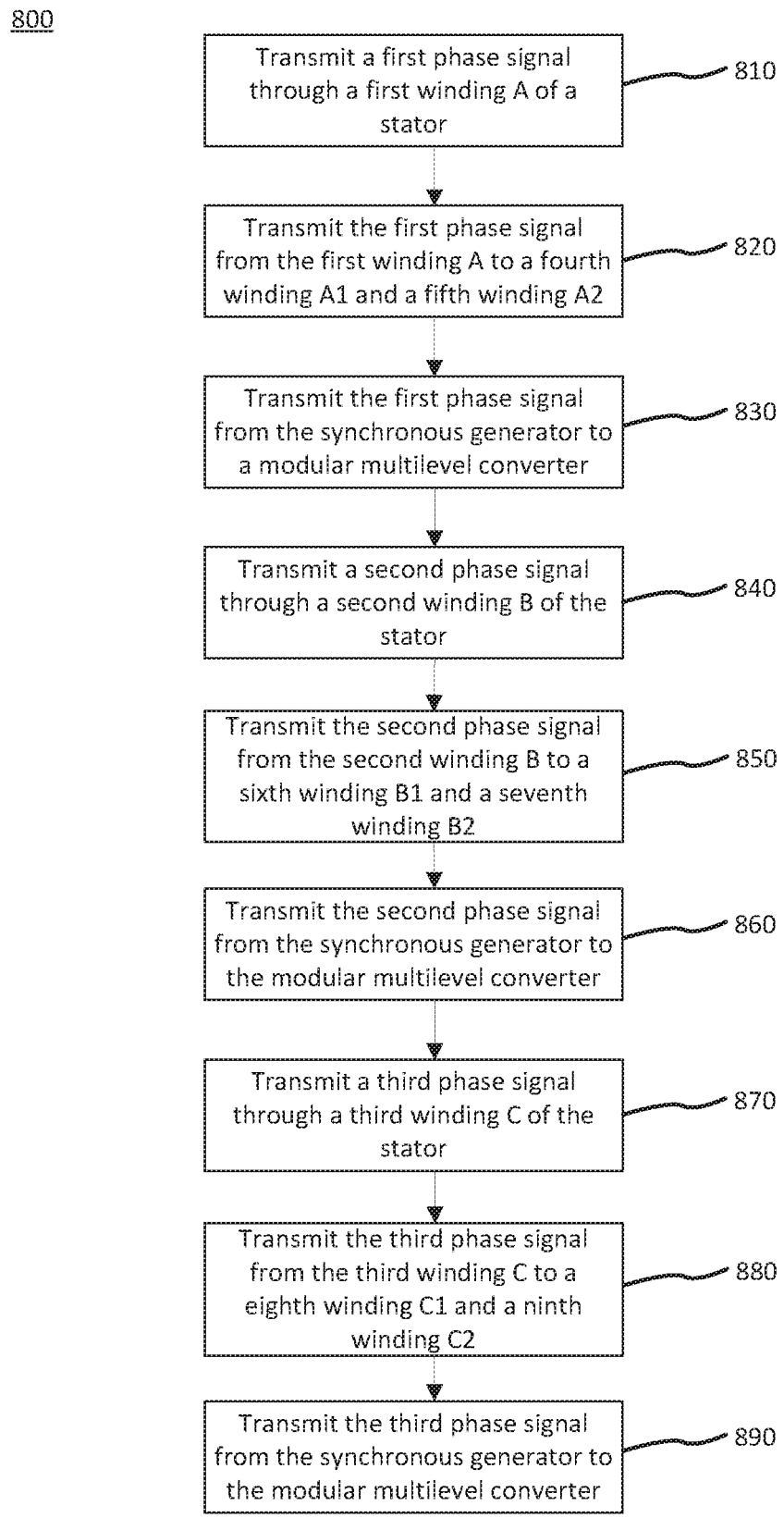
FIG. 8 illustrates a method for converting a synchronous generator three-phase signal to a direct current (DC) signal, in accordance with various embodiments.

With reference to FIG. 8 a method 800 of converting a synchronous generator three-phase signal to a direct current (DC) signal is illustrated, in accordance with various embodiments. Method 800 includes transmitting a first phase signal through a first winding of a stator (step 810).

Method 800 includes transmitting the first phase signal from the first winding to a fourth winding and a fifth winding (step 820). Method 800 may include transmitting the first phase signal from the synchronous generator to a modular multi-level converter (MMC) (step 830). Method 800 may include transmitting a second phase signal through a second winding of the stator (step 840). Method 800 may include transmitting the second phase signal from the second winding to a sixth winding and a seventh winding (step 850). Method 800 may include transmitting the second phase signal from the synchronous generator to a modular multilevel converter (MMC) (step 860). Method 800 may include transmitting a third phase signal through a third winding of the stator (step 870). Method 800 may include transmitting the third phase signal from the third winding to an eighth winding and a ninth winding (step 880). Method 800 may include transmitting the third phase signal from the synchronous generator to a modular multilevel converter (MMC) (step 890).

With combined reference to FIG. 1, FIG. 4, FIG. 5, and FIG. 8, step 810 may include transmitting first phase signal 112 through first winding A of stator 500. Step 820 may include transmitting first phase signal 112 from the first winding A to a fourth winding A1 of the stator 500 and a fifth winding A2 of the stator 500. Step 830 may include transmitting first phase signal 112 from the synchronous generator 110 to MMC 130. Step 840 may include transmitting second phase signal 114 through second winding B of stator 500. Step 850 may include transmitting second phase signal 114 from the second winding B to a sixth winding B1 of the stator 500 and a seventh winding B2 of the stator 500. Step 860 may include transmitting second phase signal 114 from the synchronous generator 110 to MMC 130. Step 870 may include transmitting third phase signal 116 through third winding C of stator 500. Step 880 may include transmitting third phase signal 116 from the third winding C to an eighth winding C1 of the stator 500 and a ninth winding C2 of the stator 500. Step 890 may include transmitting third phase signal 116 from the synchronous generator 110 to MMC 130

Benefits, other advantages, and solutions to problems have been described herein with regard to specific embodiments. Furthermore, the connecting lines shown in the various figures contained herein are intended to represent various functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An electric power system (EPS) comprising:
a modular multilevel converter (MMC); and
a synchronous generator in electronic communication with the MMC, the synchronous generator comprising:
a stator;
inner slots disposed in the stator;
outer slots disposed in the stator;
a first winding at least partially disposed in the inner slots, the first winding configured to receive a first phase signal;
a second winding at least partially disposed in the inner slots, the second winding configured to receive a second phase signal;
a third winding at least partially disposed in the inner slots, the third winding configured to receive a third phase signal;
a fourth winding at least partially disposed in the outer slots, the fourth winding configured to receive the first phase signal, the fourth winding is coupled in series with the first winding;
a fifth winding at least partially disposed in the outer slots, the fifth winding configured to receive the first phase signal, the fifth winding is coupled in series with the first winding;
a sixth winding at least partially disposed in the outer slots, the sixth winding configured to receive the second phase signal, the sixth winding is coupled in series with the second winding;
a seventh winding at least partially disposed in the outer slots, the seventh winding configured to receive the second phase signal, the seventh winding is coupled in series with the second winding;
an eighth winding at least partially disposed in the outer slots, the eighth winding configured to receive the third phase signal, the eighth winding is coupled in series with the third winding; and
a ninth winding at least partially disposed in the outer slots, the ninth winding configured to receive the third phase signal, the ninth winding is coupled in series with the third winding;
wherein the MMC comprises:
a first arm comprising a first plurality of sub-modules connected in series, the first arm connected in series with the fourth winding;
a second arm comprising a second plurality of sub-modules connected in series, the second arm connected in series with the fifth winding;
a third arm comprising a third plurality of sub-modules connected in series, the third arm connected in series with the sixth winding;
a fourth arm comprising a fourth plurality of sub-modules connected in series, the fourth arm connected in series with the seventh winding;
a fifth arm comprising a fifth plurality of sub-modules connected in series, the fifth arm connected in series with the eighth winding; and a sixth arm comprising a sixth plurality of sub-modules connected in series, the sixth arm connected in series with the ninth winding, wherein voltage increases along the first arm, the third arm, and the fifth arm and voltage decreases along the second arm, the fourth arm, and the sixth arm.

2. The EPS of claim 1, wherein the MMC is configured to convert a three-phase signal received from the synchronous generator to a DC signal.

3. The EPS of claim 2, further comprising a controller configured to control the MMC.

4. The EPS of claim 3, wherein the synchronous generator further comprises a control winding configured to regulate an output voltage of the synchronous generator and configured to be controlled by the controller.

5. The EPS of claim 1, wherein each of the sub-modules comprises at least one of a half-bridge topology, a full H-bridge topology, a half-bridge topology mixed with a full H-bridge, a cross coupled half-bridge, a clamp-double sub-module, or a semi-full-bridge.

6. The EPS of claim 1, wherein the fourth winding, the fifth winding, the sixth winding, the seventh winding, the eighth winding, and the ninth winding are inductive.

7. The EPS of claim 6, wherein the synchronous generator comprises one of a wound field generator or a permanent magnet generator.

8. The EPS of claim 7, wherein the synchronous generator is driven by a shaft.

9. A method of converting a synchronous generator three-phase signal to a direct current (DC) signal comprising:
transmitting a first phase signal through a first winding of a stator;
transmitting the first phase signal from the first winding to a fourth winding of the stator and a fifth winding of the stator, the fourth winding and the fifth winding connected in parallel and the first winding connected in series with the fourth winding and the fifth winding;
transmitting the first phase signal from the synchronous generator to a modular multilevel converter (MMC);
transmitting a second phase signal through a second winding of the stator;
transmitting the second phase signal from the second winding to a sixth winding of the stator and a seventh winding of the stator, the sixth winding and the seventh winding connected in parallel and the second winding connected in series with the sixth winding and the seventh winding;
transmitting the second phase signal from the synchronous generator to the MMC;
transmitting a third phase signal through a third winding of the stator;
transmitting the third phase signal from the third winding to an eighth winding of the stator and a ninth winding of the stator, the eighth winding and the ninth winding connected in parallel, and the third winding connected in series with the eighth winding and the ninth winding;
transmitting the third phase signal from the synchronous generator to the MMC;

receiving, by a first arm comprising a first plurality of sub-modules connected in series, the first phase signal via the fourth winding, the first arm connected in series with the fourth winding;
receiving, by a second arm comprising a second plurality of sub-modules connected in series, the first phase signal via the fifth winding, the second arm connected in series with the fifth winding;
receiving, by a third arm comprising a third plurality of sub-modules connected in series, the second phase signal via the sixth winding, the third arm connected in series with the sixth winding;
receiving, by a fourth arm comprising a fourth plurality of sub-modules connected in series, the second phase signal via the seventh winding, the fourth arm connected in series with the seventh winding;
receiving, by a fifth arm comprising a fifth plurality of sub-modules connected in series, the third phase signal via the eighth winding, the fifth arm connected in series with the eighth winding; and
receiving, by a sixth arm comprising a sixth plurality of sub-modules connected in series, the third phase signal via the ninth winding, the sixth arm connected in series with the ninth winding;
wherein voltage increases along the first arm, the third arm, and the fifth arm and voltage decreases along the second arm, the fourth arm, and the sixth arm;
wherein the synchronous generator comprises:
the stator;
inner slots disposed in the stator;
outer slots disposed in the stator;
the first winding at least partially disposed in the inner slots;
the second winding at least partially disposed in the inner slots;
the third winding at least partially disposed in the inner slots;
the fourth winding at least partially disposed in the outer slots, the fourth winding configured to receive the first phase signal; and
the fifth winding at least partially disposed in the outer slots, the fifth winding configured to receive the first phase signal;
the sixth winding at least partially disposed in the outer slots, the sixth winding configured to receive the second phase signal;
the seventh winding at least partially disposed in the outer slots, the seventh winding configured to receive the second phase signal;
the eighth winding at least partially disposed in the outer slots, the eighth winding configured to receive the third phase signal; and
the ninth winding at least partially disposed in the outer slots, the ninth winding configured to receive the third phase signal.

* * * * *